May 26, 1953   G. R. DUNCAN   2,639,851
SPREADER FOR MILK CAN FILLING MEANS
Filed Dec. 19, 1949
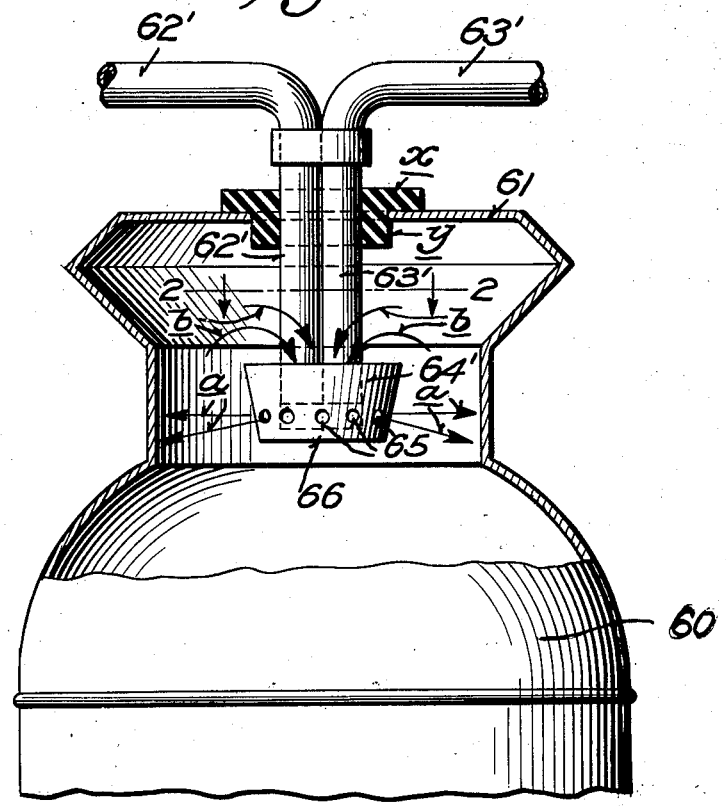
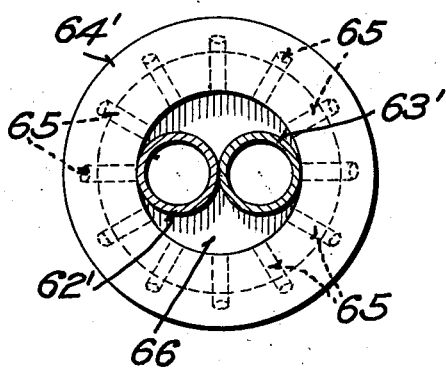
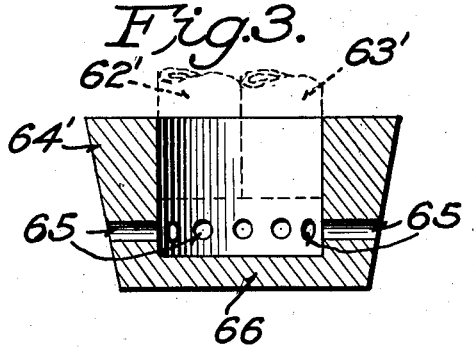
INVENTOR
GEORGE R. DUNCAN,
BY Mason, Mason & Sheridan
ATTORNEYS

Patented May 26, 1953

2,639,851

UNITED STATES PATENT OFFICE 2,639,851

SPREADER FOR MILK CAN FILLING MEANS

George R. Duncan, Washington, Mo., assignor to Zero Manufacturing Company, Washington, Mo.

Application December 19, 1949, Serial No. 133,883

5 Claims. (Cl. 226—116)

An object of the invention is to provide an improved spreader for spreading the milk as it comes from the cow against the inner walls of the milk can.

Other objects will be described in the specification and illustrated in the drawings in which:

Figure 1 shows a vertical perspective view of the suction and milk lines attached to a receptacle for milk, such as a milk can.

Figure 2 is a top plan view of the structure shown in Figure 1, with said lines in section, and Figure 3 is a vertical section of the caps with the position of the pipe ends indicated in dotted lines.

In Figures 1 to 3 is shown a typical connection from the milk and vacuum pipes such as is shown, to the interior of a milk can, of the type shown in my application Serial No. 89,375 filed April 25, 1949, now Patent No. 2,498,401, February 21, 1950, of which this application is a continuation-in-part.

The numeral 60 denotes the milk can, 61 the cover therefor, and 62 and 63 the vacuum and milk lines, which may be connected to the vacuum and milk pipes respectively of a vacuum milking and filing apparatus such as that illustrated in said Patent 2,498,401. Removably attached, such as by friction, to the end of pipes 62' and 63', is a cap member 64' having side apertures 65 and a closed lower end 66. This cap closely fits around the sides of the pipe ends as shown.

As shown in my Patent No. 2,498,401, a plurality of milk cans are sprayed exteriorly with a cooling medium such as cooled water. Milk from the milk conduit 63' moves into the lower end of the cap and issues in several streams against the interior of the milk can as shown by the arrows "a" in Figure 1. Air from the interior of the can raises in the can, as it becomes filled and passes over the open top of the cap as shown at "b," Figures 1 and 2, down the interior of the cap and out through the suction conduit 62.

The cap is held on the pipes 62' and 63' by friction due to the close fit between the pipes and the cap, as seen in Figures 1 to 3.

It will be understood that the invention is susceptible of other forms than those shown and described herein, and that therefore the description and drawings are to be construed as illustrative rather than limiting, and that I desire to be limited only to the extent set forth by the appended claims.

I claim:

1. A connection for milk cans comprising a pair of conduits, one of said conduits having an outlet opening and the other of said conduits having an inlet opening, gasket means supporting and surrounding said conduits in sealing relationship thereto, said gasket means having an outer edge adapted to sealingly engage an opening in a milk can cover, a cap adapted for location in a milk can adjacent to said outlet opening, said cap having means for positioning the same adjacent to the outlet opening in said one conduit, and a plurality of outlet openings in said cap for directing milk from said conduit outlet opening against the inside walls of a milk can, said cap having a closed lower end and an open upper end for the reception of said conduits and to provide a passage for the discharge of the displaced air in said can, said cap having side wall means which completely surrounds and which extends above said cap outlet openings.

2. A connection for milk cans comprising a pair of conduits, one of said conduits having an outlet opening and the other of said conduits having an inlet opening, gasket means supporting and surrounding said conduits in sealing relationship thereto, said gasket means having an outer edge adapted to sealingly engage an opening in a milk can cover, a cap adapted for location in a milk can adjacent to said outlet opening, said cap having means for positioning the same adjacent to the outlet opening in said one conduit, a plurality of outlet openings in said cap for directing milk from said conduit outlet opening against the inside walls of a milk can, said cap having a peripheral portion, and said plurality of outlet openings being located in said peripheral portion, said cap having a closed lower end and an open upper end for the reception of said conduits and to provide a passage for the discharge of the displaced air in said can, said cap having side wall means which completely surrounds and which extends above said cap outlet openings.

3. A connection for milk cans comprising a pair of conduits, one of said conduits having an outlet opening and the other of said conduits having an inlet opening, gasket means supporting and surrounding said conduits in sealing relationship thereto, said gasket means having an outer edge adapted to sealingly engage an opening in a milk can cover, a cap adapted for location in a milk can adjacent to said outlet opening, said cap having means for positioning the same adjacent to the outlet opening in said one conduit, a plurality of outlet openings in said cap for directing milk from said conduit outlet opening against the inside walls of a milk can, and means for removably attaching said cap to said one pipe having an outlet opening, said cap having a closed lower end and an open upper end for the reception of said conduits and to provide a passage for the discharge of the displaced air in said can, said cap having side wall means which completely surrounds and which extends above said cap outlet openings.

4. A connection for milk cans comprising a pair of conduits, one of said conduits having an outlet opening and the other of said conduits having an inlet opening, gasket means supporting and surrounding said conduits in sealing relationship thereto, said gasket means having an outer edge adapted to sealingly engage an opening in a milk can cover, a cap adapted for location in a milk can adjacent to said outlet opening, said cap having means for positioning the same adjacent to the outlet opening in said one conduit, a plurality of outlet openings in said cap for directing milk from said conduit outlet opening against the inside walls of a milk can, said cap having a peripheral portion, and said plurality of outlet openings being located in said peripheral portion, and means for removably attaching said cap to said one pipe having an outlet opening, said cap having a closed lower end and an open upper end for the reception of said conduits and to provide a passage for the discharge of the displaced air in said can, said cap having side wall means which completely surrounds and which extends above said cap outlet openings.

5. A connection for milk cans comprising a pair of conduits, one of said conduits having an outlet opening and the other of said conduits having an inlet opening, gasket means supporting and surrounding said conduits in sealing relationship thereto, said gasket means having an outer edge adapted to sealingly engage an opening in a milk can cover, a cap adapted for location in a milk can adjacent to said outlet opening, said cap having means for positioning the same adjacent to the outlet opening in said one conduit, a plurality of outlet openings in said cap for directing milk from said conduit outlet opening against the inside walls of a milk can, and means for attaching said cap to said conduit having an outlet opening, said cap having a portion extending below said outlet opening when said conduit last named is mounted in operative position on the cover of a milk can, said cap having a closed lower end and an open upper end for the reception of said conduits and to provide a passage for the discharge of the displaced air in said can, said cap having side wall means which completely surrounds and which extends above said cap outlet openings.

GEORGE R. DUNCAN.

References Cited in the file of this patent

UNITED STATES PATENTS

| Number | Name | Date |
|---|---|---|
| 793,940 | Kramer et al. | July 4, 1905 |
| 968,898 | Torpy | Aug. 30, 1910 |
| 1,184,632 | De Leon | May 23, 1916 |
| 1,301,992 | Anderson | Apr. 29, 1919 |
| 1,417,801 | Cook | May 30, 1922 |
| 1,430,191 | Rutherford | Sept. 26, 1922 |
| 1,437,916 | Shelor | Dec. 5, 1922 |
| 1,859,214 | McCornack | May 17, 1932 |
| 1,915,516 | Carpenter | June 27, 1933 |